(12) United States Patent
Graber et al.

(10) Patent No.: US 11,172,061 B1
(45) Date of Patent: Nov. 9, 2021

(54) INITIATING AUTOMATED ACTIONS USING RING-SHAPED ELECTRONIC DEVICES

(71) Applicant: Amazon Technologies, Inc., Seattle, WA (US)

(72) Inventors: Sarah Graber, Seattle, WA (US); Brad Arnold, Redmond, WA (US); Daniel Borrelli, San Francisco, CA (US); Samuel Elbert McGowan, Seattle, WA (US); Joshua Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/254,908

(22) Filed: Jan. 23, 2019

(51) Int. Cl.
| | |
|---|---|
| *H04M 1/72454* | (2021.01) |
| *H04W 4/12* | (2009.01) |
| *H04M 3/533* | (2006.01) |
| *H04M 3/53* | (2006.01) |
| *G06Q 20/40* | (2012.01) |
| *G06Q 20/32* | (2012.01) |
| *H04M 1/72412* | (2021.01) |

(52) U.S. Cl.
CPC ...... *H04M 1/72454* (2021.01); *G06Q 20/327* (2013.01); *G06Q 20/401* (2013.01); *H04M 1/72412* (2021.01); *H04M 3/5322* (2013.01); *H04M 3/53333* (2013.01); *H04W 4/12* (2013.01); *H04M 2201/40* (2013.01); *H04M 2250/22* (2013.01)

(58) Field of Classification Search
CPC ....... G06Q 30/0601; H04L 51/04; H04L 5/14; H04L 65/4061; H04L 61/1594; H04W 4/10; H04W 76/45; H04W 88/02; H04W 4/21; H04M 2203/554
See application file for complete search history.

(56) References Cited

U.S. PATENT DOCUMENTS

| | | | | |
|---|---|---|---|---|
| 2006/0184679 | A1* | 8/2006 | Izdepski | H04L 67/2823 709/229 |
| 2011/0319104 | A1* | 12/2011 | Williams | H04M 1/72552 455/466 |
| 2014/0358574 | A1* | 12/2014 | Tara | H04L 51/24 705/2 |
| 2015/0065090 | A1* | 3/2015 | Yeh | H04W 12/06 455/411 |
| 2017/0034333 | A1* | 2/2017 | Vishwanath | H04M 1/2757 |
| 2018/0014187 | A1* | 1/2018 | Chan | G06F 3/017 |
| 2019/0222684 | A1* | 7/2019 | Li | H04M 1/72519 |
| 2020/0152186 | A1* | 5/2020 | Koh | G10L 15/22 |

\* cited by examiner

*Primary Examiner* — Fred A Casca
(74) *Attorney, Agent, or Firm* — Eversheds Sutherland (US) LLP

(57) ABSTRACT

Systems, methods, and computer-readable media are disclosed for systems and methods for initiating automated actions using ring-shaped electronic devices. Example methods may include determining, by a ring-shaped electronic device comprising a button, a first user interaction with the button, determining that a first action associated with the first button sequence identifier is to initiate a synchronous communication, determining contact information associated with the first action, and initiating the synchronous communication using the contact information.

20 Claims, 7 Drawing Sheets

INITIATING AUTOMATED ACTIONS USING RING-SHAPED ELECTRONIC DEVICES

BACKGROUND

Electronic devices, such as smartphones, tablets, and the like, may be used for various purposes, such as making calls, accessing information, sending messages, consuming content, and so forth. In some instances, users may use electronic devices for certain purposes by interacting with the devices. For example, a user may take the user's phone out of their pocket in order to send a message. However, users may not desire to physically interact with certain electronic devices each time the user desires to perform a certain action.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
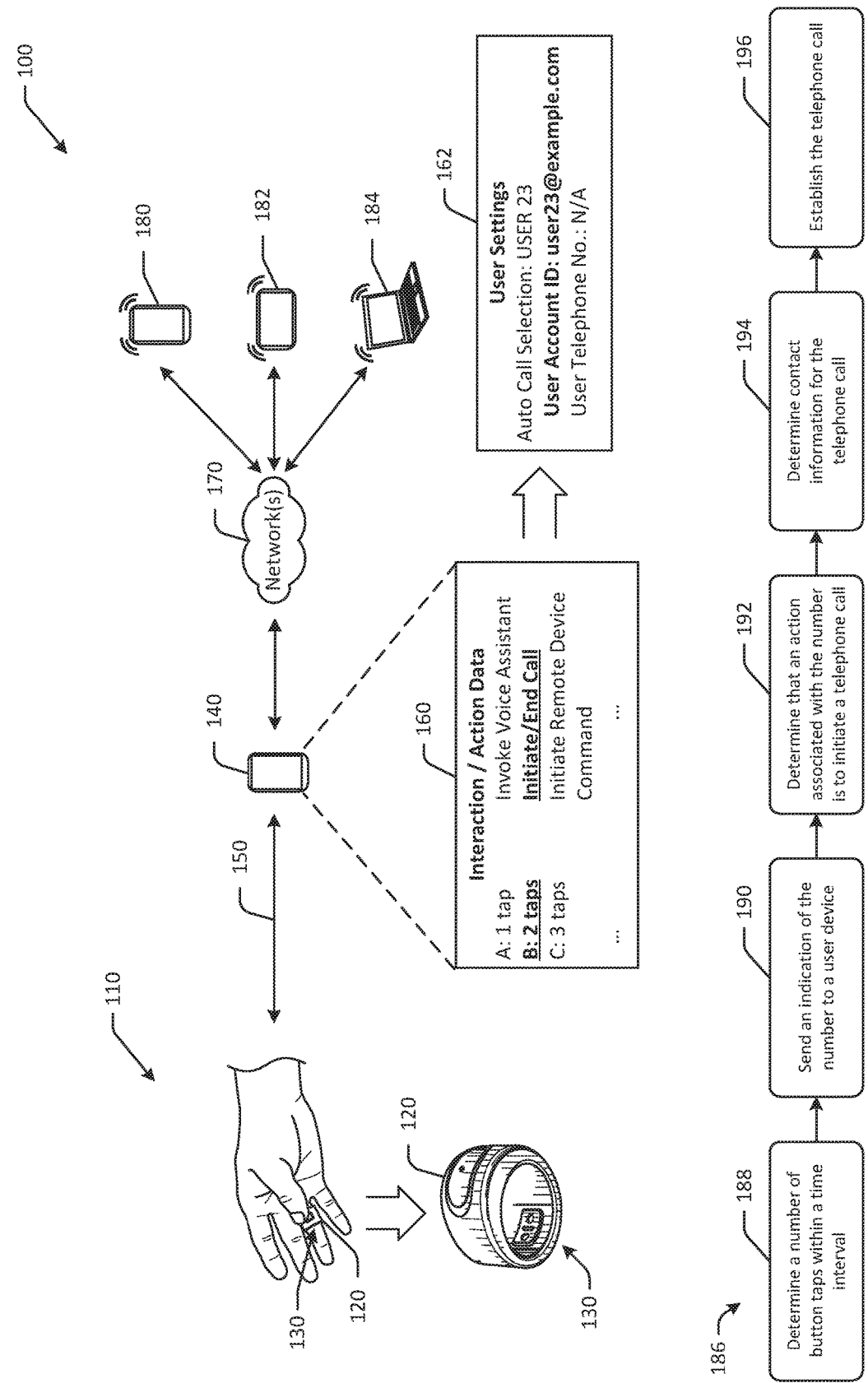
FIG. 1 is a schematic illustration of an example use case for initiating automated actions using ring-shaped electronic devices and presentation in accordance with one or more example embodiments of the disclosure.

Wearable devices may include electronic devices that a user can wear, for example, as an accessory, or can otherwise take with them, such as in the user's pocket. Wearable devices may include watches, bracelets, glasses, electronic trackers, and so forth. Because wearable devices may be worn by users, factors of the device including size, weight, shape, and the like may affect a user experience with the device. For example, a device that is bulky, heavy, or too large may be impractical for certain users to use or wear. In addition, reducing a size or footprint of a device may affect the functionality of the device. For example, reducing the size of a battery in the device may reduce an amount of time the device can operate without being recharged. Accordingly, a size, shape, weight, and/or other factors may impact not only a user experience with a wearable device, but functionality of the device as well.

Wearable devices may be used, in some instances, to communicate wirelessly with other devices. For example, a smartwatch may wirelessly communicate with a smartphone using a Bluetooth or other wireless connection. Users may use wearable devices to receive notifications of communications, send messages, and/or for other purposes. Certain wearable devices may be displayless, or may not include displays at which information, such as text, images, videos, or other information, can be presented. Displayless devices may not, in some embodiments, include any visual indicators, such as light emitting diodes, while in other embodiments, displayless devices may include light emitting diodes. To interact with displayless devices, users may use buttons, voice, and/or other forms of input, as touch inputs may be unavailable at displayless devices.

In addition, to perform certain tasks, such as adjusting a temperature of a thermostat, selecting a certain telephone number to call, and other tasks, a user may use a user device, such as a smartphone, instead of a wearable device. As a result, the user may have to physically interact with the user device. However, in some instances, the user device may be in the user's pocket, or in the user's bag, or in a different location. To access the device, the user may therefore have to retrieve the device itself.

Embodiments of the disclosure may include ring-shaped electronic devices that can be worn by users on a finger, and that are configured to detect voice input and to wirelessly communicate with other electronic devices. Certain embodiments may be configured to detect various user inputs and may be configured to automatically implement one or more actions. As a result, users may not have to physically interact with a user device, such as a smartphone. For example, in some instances, a user may be unable or unwilling to take a smartphone out of the user's pocket or bag. However, the user may wish to set a timer, make a phone call, send a message, or perform another task. Using the ring-shaped electronic devices described herein, the user may speak a voice command to the ring-shaped electronic device, and the ring-shaped electronic device may send the voice command to the user's smartphone or other device. In some embodiments, the user may interact with the ring-shaped electronic devices, such as by pressing or tapping a button in a certain sequence (as referred to herein, a button tap may be a brief press of a button, and a button press may be a relatively longer press of a button), and one or more actions associated with the user interaction may be automatically implemented. For example, the ring-shaped electronic device may send one or more signals to a connected user device, and may cause the user device to implement one or more actions, such as initiating a phone call. The user may therefore not have to physically interact with the user device, and can instead perform certain actions using the ring-shaped electronic devices described herein. Other examples of functionality include using the ring-shaped electronic devices to control other electronic devices, such as televisions, stereos, content streaming devices, and so forth, sending voice messages, receiving information (e.g., audible presentation of a current time, etc.), and other functionality.

Because the user may wear the ring-shaped electronic device around a finger, a size of the ring-shaped electronic device may be limited, and some embodiments may therefore be displayless, or devoid of a display.

Embodiments of the disclosure include systems and methods of initiating automated actions using ring-shaped electronic devices. For example, certain embodiments may automatically initiate phone calls or text messages at a smartphone based at least in part on a user interaction at a ring-shaped electronic device. In another example, prestored or preset voice data representing a specific voice command may be sent to a remote server (e.g., a voice processing server for a voice assistant service, etc.) based at least in part on a user interaction at a ring-shaped electronic device. As a result, the user may cause one or more actions to be automatically initiated using a ring-shaped electronic device, and may therefore not have to interact with a user device such as a smartphone.

This disclosure relates to, among other things, devices, systems, methods, computer-readable media, techniques, and methodologies for initiating automated actions using ring-shaped electronic devices and presentation. Certain embodiments may automatically cause a user device, such as a smartphone, to send voice data or text data to a remote server, or to send a message, or to initiate a voice call, and/or other actions. Some embodiments may include customizable actions associated with various user interactions with a ring-shaped electronic device. For example, a button press-and-hold at a ring-shaped electronic device may initiate a phone call to a certain user, while three consecutive button taps at a ring-shaped electronic device may cause a smartphone to send stored audio (or a stored speech-to-text transcription of the audio) representing a command to "adjust a thermostat to 74 degrees" to a remote server for subsequent implementation at the thermostat. A user of the ring-shaped electronic device may therefore not only avoid interaction with a user device, such as a smartphone, but may also avoid interacting with the ring-shaped electronic device using voice as well in some embodiments.

Referring to FIG. 1, an example use case 100 for initiating automated actions using ring-shaped electronic devices is depicted in accordance with one or more example embodiments of the disclosure. In the illustrated example, a user may use a ring-shaped electronic device 120 to communicate with another electronic device, such as a smartphone 140. In other examples, the ring-shaped electronic device 120 may be used to communicate with other electronic devices, such as streaming devices, television devices, home automation devices (e.g., thermostat devices, appliances, etc.), and/or other devices. The ring-shaped electronic device 120 may include one or more buttons 130. The button 130 may be on a lower portion of the ring-shaped electronic device 120, such that a user can push the button 130 with a thumb of the hand that the user is wearing the ring-shaped electronic device 120 on.

The ring-shaped electronic device 120 may be wirelessly connected to the smartphone 140 over a wireless connection 150, such as a Bluetooth connection, a WiFi connection, or another suitable wireless connection. To interact with the ring-shaped electronic device 120, the user that is wearing the ring-shaped electronic device 120 may, in some instances, interact with the button 130 or other component of the ring-shaped electronic device 120. Different user interactions with the ring-shaped electronic device 120 may result in different functions being triggered at the ring-shaped electronic device 120. For example, certain gesture interactions, such as raising a hand to the user's mouth, may cause the ring-shaped electronic device 120 to initiate monitoring for voice input. In another example, certain button interactions, such as a certain number of taps or presses, a combination of taps and/or presses, and/or other button interactions may trigger various functions, such as initiating phone calls, sending signals to other devices (e.g., to a television or content streaming device, etc.), and/or other functions. In some instances, user interactions at the ring-shaped electronic device 120 may cause the ring-shaped electronic device 120 to send one or more signals or data to the smartphone 140, which may initiate and/or implement one or more actions responsive to the signals or data. In some embodiments, the user may interact with the ring-shaped electronic device 120 using voice, such as by speaking a wake word (e.g., "Alexa," etc.). The ring-shaped electronic device 120 may listen for a request or voice command, and may respond accordingly. For example, the ring-shaped electronic device 120 may cause one or more operations to be performed, such as controlling other devices (e.g., televisions, lights, radios, thermostats, etc.), may respond with audible information (e.g., weather, news, messages, etc.), and/or may perform different actions in response to a request or command.

The ring-shaped electronic device 120 may include one or more microphones that may be used to detect voice input and/or generate a signal representing audio input. For example, in FIG. 1, the ring-shaped electronic device 120 may include a first microphone positioned at or near a bottom of the ring-shaped electronic device 120, where the bottom of the ring-shaped electronic device 120 may face the user's palm when the user makes a first ("bottom," "top," "upper," "lower," and "side" as used herein describe relative positioning for illustrative examples and not absolute positioning). Accordingly, to speak into the first microphone, the user may raise the user's hand towards the user's mouth and may speak into or near the first microphone.

Users may use the ring-shaped electronic device 120 for one or more purposes. For example, users may use the ring-shaped electronic device 120 to interact with a voice assistant (e.g., via speaking voice inputs to the ring-shaped electronic device 120, etc.), to interact with other users (e.g., via phone calls or other voice-based and/or text-based communications, etc.), to perform certain actions (e.g., automated actions such as controlling other devices, etc.), and/or for other purposes.

In some embodiments, certain user interactions may be associated with user-selected options. Using a companion mobile application at the smartphone 140, the user may select and/or designate certain actions to be associated with certain user interactions. The resulting associations may be stored at the smartphone 140 as interaction/action data 160. In the example of FIG. 1, a first user interaction (illustrated as interaction "A" in FIG. 1) may be one button tap of the button 130. The user may have associated a corresponding action of "invoke voice assistant" with the first user interaction. As a result, if the user taps the button 130 once within a certain time interval, the voice assistant at the smartphone 140 may be invoked. The user may then speak a voice input at the ring-shaped electronic device 120. A second user interaction of two button taps may be associated with a corresponding action of "initiate/end call." As a result, if the user taps the button 130 twice within a certain time interval (or taps the button 130 a second time within a time interval of tapping the button 130 a first time), a phone call may be initiated, or if a phone call is active, the phone call may be ended. In some embodiments, the phone call may be initiated to a preselected contact, and may be a cellular phone call or an internet-based phone call (e.g., a cellular data call, a WiFi call, a VOIP call, etc.). A third user interaction of three button taps may be associated with a corresponding action of "initiate remote device command." As a result, if the user taps the button 130 three times within a certain time interval (or taps the button 130 a third time within a time interval of tapping the button 130 a second time), a remote device command may be initiated. In some embodiments, a command signal may be sent to the remote device, while in other embodiments, audio and/or text data may be sent to one or more remote servers as an input to a voice assistant, without the user having to actually speak the voice command (e.g., the audio data may be prerecorded and/or the text data may be predetermined, for example during a setup phase of the ring-shaped electronic device 120, etc.). The actions associated with the interactions in the interaction/action data 160 may be preset and/or may be customizable by a user of the ring-shaped electronic device 120. Although illustrated in FIG. 1 as various numbers of button taps, any type of button interactions or other user interactions with the ring-shaped electronic device 120 may be used.

In the example of FIG. 1, the user may tap the button 130 of the ring-shaped electronic device 120 twice within a time interval. One or more processors coupled to memory at the ring-shaped electronic device 120 may detect or otherwise determine the two button taps. The ring-shaped electronic device 120 may send an indication of the user interaction of two button taps to the smartphone 140 using the wireless connection 150. For example, the ring-shaped electronic device 120 may send an identifier, such as an alphanumeric identifier or other identifier, associated with the user interaction to the smartphone 140. The smartphone 140 may be in the user's pocket or elsewhere. The smartphone 140 may receive the indication from the ring-shaped electronic device 120 and may determine, using the interaction/action data 160 and the indication (which may be the identifier), that an action of initiate/end call is associated with the user interaction. The smartphone 140 may determine that no phone call is active, and may therefore determine that a phone call is to be initiated.

The smartphone 140 may determine, using user settings data 162, that automatic calls are to be initiated with a user identifier, such as "User 23." The smartphone 140 may determine contact information associated with the user identifier. Contact information may include phone numbers, email addresses, device identifiers, user account identifiers, and/or other contact information. Based at least in part on the contact information associated with the user identifier, the smartphone 140 may initiate a call to the user identifier using a cellular network or a data network. For example, in FIG. 1, a user account identifier may be stored in associated with the user identifier, and no phone number may be available, so the smartphone 140 may initiate a call to the user account identifier. If both types of contact information were available, the user may select a priority, or the smartphone 140 may select a type of contact information to use based at least in part on available networks, signal strength, etc. The smartphone 140 may therefore initiate a call over one or more networks 170 to one or more devices associated with the user account identifier. For example, a recipient of the call may have a smartphone 180, a tablet 182, and a laptop 184 associated with the user account identifier, and therefore, calls made to the user account identifier may be established with any of the smartphone 180, the tablet 182, or the laptop 184. The recipient may receive notifications of the incoming call at one or more of the devices, and may accept the call using any of the associated devices. A call may therefore be established.

The user of the ring-shaped electronic device 120 may use the speaker(s) and microphone(s) of the ring-shaped electronic device 120 to communicate with the call recipient. As a result of using the ring-shaped electronic device 120, the user may not have had to interact directly with the smartphone 140, and may cause the smartphone 140 to automatically initiate (and establish) a call with a preselected recipient with minimal interaction on the part of the user. For example, the only user the action may have taken to establish the call with the recipient was a certain user interaction (e.g., two button taps) at the ring-shaped electronic device 120, and the user did not have to interact with the smartphone 140 at the time of making the call. User friction with the ring-shaped electronic device 120, as well as the smartphone 140, is therefore reduced as a result of the ring-shaped electronic device 120 and the association of user interactions and corresponding actions.

To initiate automated actions using ring-shaped electronic devices, an example process flow 186 is presented and may be performed, for example, by one or more modules at the ring-shaped electronic device 120 and/or the user device 140. The ring-shaped electronic device 120 and/or other user device may include at least one memory that stores computer-executable instructions and at least one processor configured to access the at least one memory and execute the computer-executable instructions to perform various actions or operations, such as one or more of the operations in the process flow 186 of FIG. 1.

At a first block 188, the ring-shaped electronic device 120 may determine a number of button taps within a time interval. For example, the ring-shaped electronic device 120 may detect a user interaction, which may be a button interaction, a voice interaction, or a different interaction. The ring-shaped electronic device 120 may detect the user interaction using firmware executing on one or more processors at the ring-shaped electronic device 120. For example, the ring-shaped electronic device 120 may determine a user interaction of a button interaction with two button taps within a time interval. To determine the two button taps, the ring-shaped electronic device 120 may determine a first button tap of the button 130, and may determine a second button tap of the button 130 within a time interval (e.g., within 50 milliseconds, etc.) of the first button tap. The ring-shaped electronic device 120 may optionally determine that a third button tap of the button 130 did not occur within the time interval of the second button tap, and as a result, the ring-shaped electronic device 120 may determine that the button 130 was tapped two times.

At a second block 190, the ring-shaped electronic device 120 may send an indication of the number to a user device. For example, the ring-shaped electronic device 120 may send an indication of the number of button taps, such as two button taps, to a user device, such as the smartphone 140. In some embodiments, the ring-shaped electronic device 120 may determine a user interaction identifier associated with the detected user interaction. For example, the ring-shaped electronic device 120 may determine a first button sequence identifier associated with two button taps. The ring-shaped electronic device 120 may send the user interaction identifier, such as the first button sequence identifier, to the smartphone 140 or other user device. The ring-shaped electronic device 120 may send an indication of the first button sequence identifier to the smartphone 140 or other user device via the wireless connection 150.

At a third block 192, the ring-shaped electronic device 120 (or the smartphone 140 or other user device in some embodiments) may determine that an action associated with the number is to initiate a telephone call. For example, the smartphone 140 may receive the number of button taps, or another user interaction identifier, from the ring-shaped electronic device 120, and may determine an associated action (e.g., using the interaction/action data 162, etc.). The smartphone 140 may determine that the action associated with the first button sequence identifier is to initiate a telephone call to a specific contact.

At a fourth block 194, the ring-shaped electronic device 120 (or the smartphone 140 or other user device in some embodiments) may determine contact information for the telephone call. For example, the smartphone 140 may determine a first telephone number associated with the first button sequence identifier and/or the action associated with the user interaction identifier. The contact information may be a telephone number, a user account identifier, a username, a device identifier, and/or another user identifier. The ring-shaped electronic device 120 and/or the smartphone 140 may determine a suitable contact method if more than one type of contact information is stored at the smartphone 140 for the user that is to receive the telephone call.

At a fifth block 196, the ring-shaped electronic device 120 and/or the smartphone 140 may establish the telephone call. For example, the smartphone 140 may initiate a telephone call to the first telephone number. The recipient may accept the telephone call. The user of the ring-shaped electronic device 120 may then communicate with voice input using a microphone of the ring-shaped electronic device 120 and/or a speaker of the ring-shaped electronic device 120. For example, the ring-shaped electronic device 120 may send voice data representative of the user's voice input to the smartphone 140, and the ring-shaped electronic device 120 may receive audio data from the smartphone 140. The ring-shaped electronic device 120 may present the audio data using a speaker of the ring-shaped electronic device. To end the call, the user of the ring-shaped electronic device 120 may tap the button 130. The ring-shaped electronic device 120 may determine a button tap of the button 130 while the telephone call is active, and may send an indication of the button tap to the smartphone 140. The smartphone 140 may then cease or end the telephone call. In some embodiments, such as the example of FIG. 1, the user may have to tap the button 130 twice to end the phone call, as the same interaction may be used to initiate and end the phone call.

As a result, users can not only interact with wirelessly connected user devices, such as smartphones, using the ring-shaped electronic device 120, but can also initiate certain actions using designated user interactions with the ring-shaped electronic device 120.

Example embodiments of the disclosure provide a number of technical features or technical effects. For example, in accordance with example embodiments of the disclosure, certain embodiments of the disclosure may automatically initiate phone calls or other communications, automatically control remote devices, and/or automatically initiate other actions based at least in part on user interactions with ring-shaped electronic devices. As a result of improved functionality, a number of actions needed by a user to complete certain tasks may be reduced, thereby decreasing friction of the user experience with not only the ring-shaped electronic device, but connected devices as well. Embodiments of the disclosure may improve computing efficiency and bandwidth by reducing a number of actions and calculations that need to be performed to initiate certain tasks. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
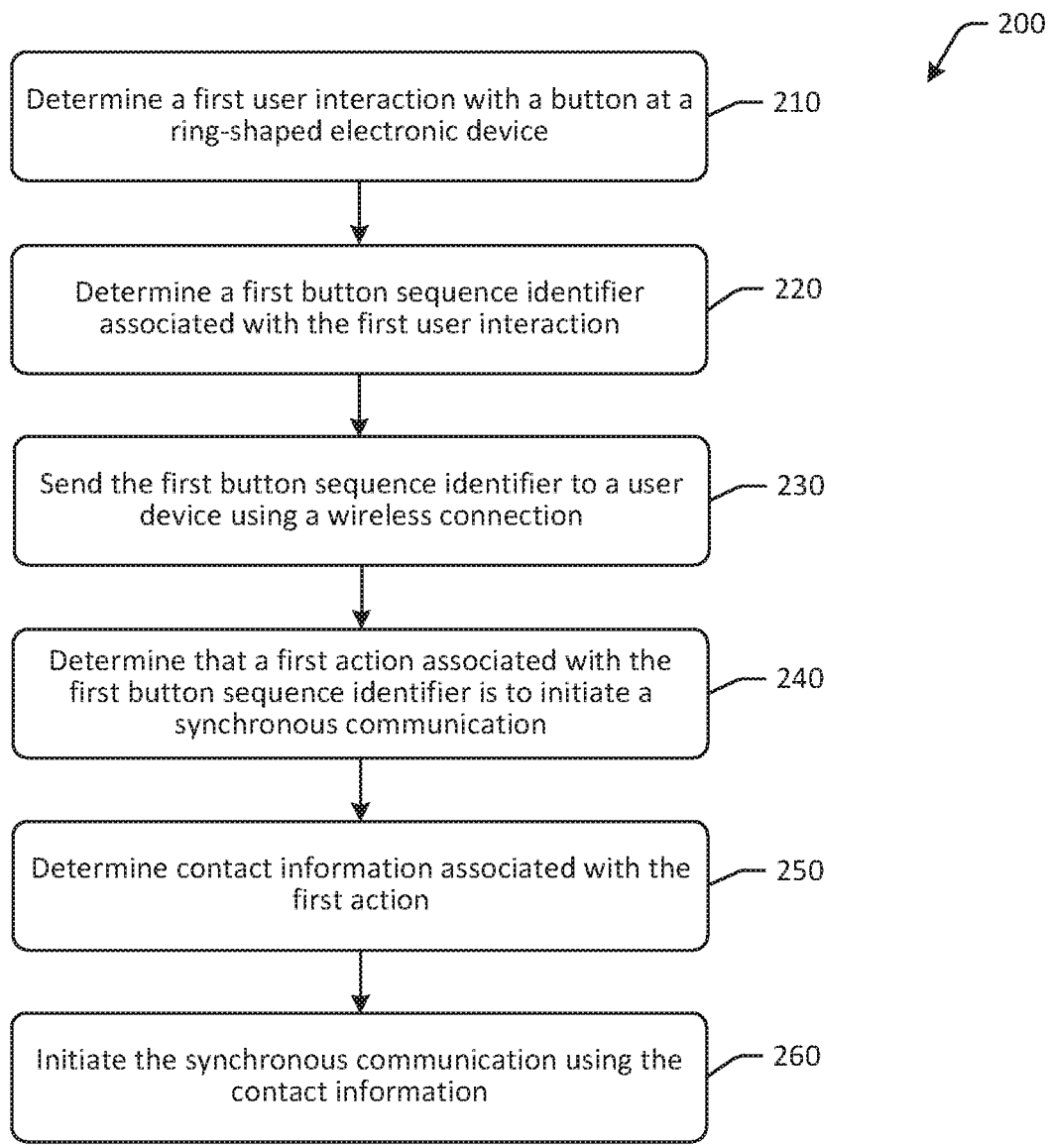
FIG. 2 is a schematic illustration of an example process flow for initiating automated actions using ring-shaped electronic devices in accordance with one or more example embodiments of the disclosure.

FIG. 2 depicts an example process flow 200 for initiating automated actions using ring-shaped electronic devices in accordance with one or more example embodiments of the disclosure. While example embodiments of the disclosure may be described in the context of ring-shaped electronic devices, it should be appreciated that the disclosure is more broadly applicable to any type of wearable device. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a ring-shaped electronic device, may be executed to determine a first user interaction with a button at the ring-shaped electronic device. For example, one or more interaction detection modules at a ring-shaped electronic device may determine a first user interaction with the button. User interactions with the ring-shaped electronic device may include voice interactions, button interactions, gesture interactions, and/or other interactions. User interactions with the button may include one or more taps, presses, press-and-hold, and/or other interactions or combinations thereof. Button user interactions may include more than one individual interaction over time. For example, a user interaction with the button may include two or three button taps in some embodiments. Some embodiments of ring-shaped electronic devices may include one or more buttons, one or more speakers, one or more microphones, one or more motion sensors, and/or other or different components. In one example, the ring-shaped electronic device may determine that the first user interaction with the button is a plurality of button taps within a time interval.

At block 220 of the process flow 200, computer-executable instructions stored on a memory of a device, such as a ring-shaped electronic device, may be executed to determine a first button sequence identifier associated with the first user interaction. For example, one or more interaction detection modules at a ring-shaped electronic device may determine a user interaction identifier, such as a button sequence identifier, associated with the detected first user interaction. The user interaction identifier may be any suitable identifier that indicates the detected user interaction at the ring-shaped electronic device.

At block 230 of the process flow 200, computer-executable instructions stored on a memory of a device, such as a ring-shaped electronic device, may be executed to send the first button sequence identifier to a user device using a wireless connection. For example, one or more communication modules at a ring-shaped electronic device may be configured to send the first button sequence identifier to a user device using a wireless connection. The ring-shaped electronic device may be wirelessly connected to a user device, such as a smartphone, tablet, content streaming device, voice assistant device, speaker device, and/or other user device via a wireless connection such as Bluetooth, WiFi, ZigBee, Near Field Communication, or another suitable wireless connection protocol. The ring-shaped electronic device may send the first button sequence identifier (or other user interaction identifier) to a connected user device.

At block 240 of the process flow 200, computer-executable instructions stored on a memory of a device, such as a ring-shaped electronic device, may be executed to determine that a first action associated with the first button sequence identifier is to initiate a synchronous communication. For example, one or more modules at the user device that is connected to the ring-shaped electronic device, or the ring-shaped electronic device itself in some embodiments, may determine that a first action associated with the first button sequence identifier is to initiate a synchronous communication. For example, a user may preselect or pre-associate certain user interactions with the ring-shaped electronic device with certain actions that are to be automatically initiated upon detection of the user interaction. The user interactions and associated actions may be stored at the ring-shaped electronic device, at the user device, and/or at a different computer system. The user interactions and associated actions may be customizable by users and may be changed over time. The user device, such as a smartphone, may receive the first button sequence identifier or other user interaction identifier and may determine an associated action. The user device may determine that the action associated with the first button sequence identifier is to initiate a synchronous communication, such as a voice call, to a certain user or contact.

At block 250 of the process flow 200, computer-executable instructions stored on a memory of a device, such as a ring-shaped electronic device, may be executed to determine contact information associated with the first action. For example, one or more modules at the user device that is connected to the ring-shaped electronic device, or the ring-shaped electronic device itself in some embodiments, may determine contact information associated with the first action. Contact information may be determined using a contact list, stored contact data at the user device or ring-shaped electronic device, remotely stored contact data, or other data storage. Contact information may include any suitable type of contact information, such as telephone numbers, email addresses, user account identifiers, device identifiers, and/or other types of contact information.

At block 260 of the process flow 200, computer-executable instructions stored on a memory of a device, such as a ring-shaped electronic device, may be executed to initiate the synchronous communication using the contact information. For example, one or more modules at the user device that is connected to the ring-shaped electronic device, or the ring-shaped electronic device itself in some embodiments, may initiate the synchronous communication using the contact information. The synchronous communication may be initiated using the contact information. If more than one type of contact information is available, the contact information used to initiate the communication may be prioritized based on user settings, based on active connections of the user device, based on signal strength at the user device, and/or based on other factors or a combination thereof. For example, if the contact information includes a telephone number, the synchronous communication may be initiated by initiating a telephone call via a cellular network using the telephone number.

In another example, if the contact information includes a user account identifier, the synchronous communication may be initiated by initiating the synchronous communication via a cellular data network using at least one user device identifier associated with the user account identifier. For example, the user device and/or a remote server may determine a set of user device identifiers associated with the user account identifier that is the recipient of the communication, and may cause a notification of an incoming synchronous communication to be set to at least one of the user device identifiers. The recipient may accept the incoming call and the synchronous communication may be established.

Figure 3:
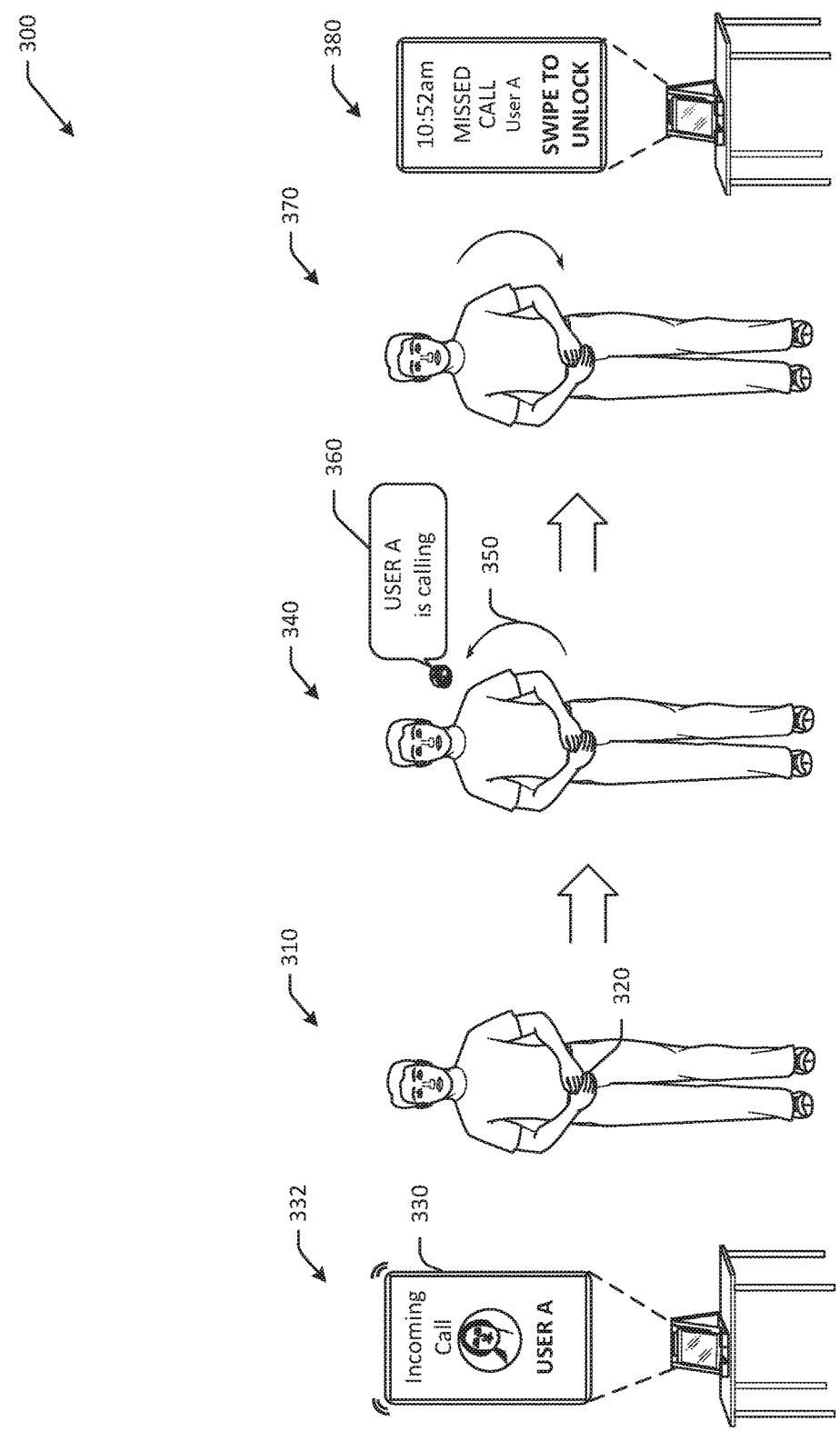
FIG. 3 is a schematic illustration of an example use case for using gestures with ring-shaped electronic devices in accordance with one or more example embodiments of the disclosure.

FIG. 3 is a schematic illustration of an example use case for using gestures with ring-shaped electronic devices in accordance with one or more example embodiments of the disclosure. Different embodiments may include different, additional, or fewer inputs or outputs than those illustrated in the example of FIG. 3.

In FIG. 3, at a first instance 310, a user may be wearing a ring-shaped electronic device 320. The ring-shaped electronic device 320 may be wirelessly connected to a smartphone 330. The smartphone 330 may be in the user's rear pocket, on a nearby table, or elsewhere, such as in the user's bag or in a different location in an ambient environment. At the first instance 310, the user may be receiving a communication, such as an incoming call 332. As a result, the smartphone 330 may vibrate or otherwise notify the user of the incoming call 332. The smartphone 330 may generate a notification indicative of an incoming synchronous communication, such as the incoming call 332. The user may not desire to remove the smartphone 330 from the user's pocket or to retrieve the smartphone 330 from the table. The user may desire to know who is calling without interacting with the smartphone 330.

The ring-shaped electronic device 320 may be configured to determine or detect one or more gestures and to implement certain actions when a certain gesture is detected. The ring-shaped electronic device 320 may determine motion data representing a user gesture during presentation of the notification (e.g., during the active incoming call, etc.) and may cause audible presentation of contact information associated with the incoming synchronous communication. For example, while the incoming call 332 is active, at a second instance 340, the user may perform an upward gesture 350 representing a motion of moving the user's hand from the user's side towards the user's ear. The ring-shaped electronic device 320 may monitor motion sensor data from a motion sensor of the ring-shaped electronic device 320 to determine whether the motion sensor data corresponds to a certain gesture. For example, the ring-shaped electronic device 320 may determine, using the motion sensor data, that the user raised the user's hand from the user's side to the user's ear, or the upward gesture 350 illustrated in FIG. 3. The ring-shaped electronic device 320 may detect motion sensor data indicative of a user gesture representing an upward arm motion to a user's ear, and may determine a telephone number associated with the incoming call. The ring-shaped electronic device 320 may determine a named contact associated with the telephone number in contact data stored at the user device, such as the smartphone 330, and may present the named contact using the speaker of the ring-shaped electronic device 320.

The ring-shaped electronic device 320 may determine that the upward gesture 350 was detected while the incoming call 332 was active. As a result, the ring-shaped electronic device 320 may audibly present caller identification information 360 using one or more speakers of the ring-shaped electronic device 320. For example, the ring-shaped electronic device 320 may audible present "User A is calling" as the caller identification information 360. This may be because the user is interested in hearing who is calling without having to interact with the smartphone 330. The user may then decide whether to accept the call.

At a third instance 370, the user may decide not to accept the incoming call within a time interval, such as about five seconds, and may return the user's arm to a normal position. The ring-shaped electronic device 320 may determine that the user did not accept the call, and a delayed notification 380 may therefore be presented at the smartphone 330. The delayed notification 380 may indicate that the user missed a call from User A, and may be presented to the user upon a subsequent interaction with the smartphone 330.

For example, the ring-shaped electronic device 320 may generate haptic feedback indicative of the incoming call 332, and may determine that the button of the ring-shaped electronic device 320 was not tapped or interacted with within a time interval. As a result, the ring-shaped electronic device 320 may cease the haptic feedback, and may send an indication that the button was not tapped within the time interval to the smartphone 330. The smartphone 330 may determine that the incoming call is canceled, and may generate the missed call notification 380.

If the user had accepted the call, such as by pressing a button at the ring-shaped electronic device 320, the user may use voice to communicate with the caller (e.g., User A) via the ring-shaped electronic device 320. The user may not have to interact with the smartphone 330 in the event the call was accepted.

Figure 4:
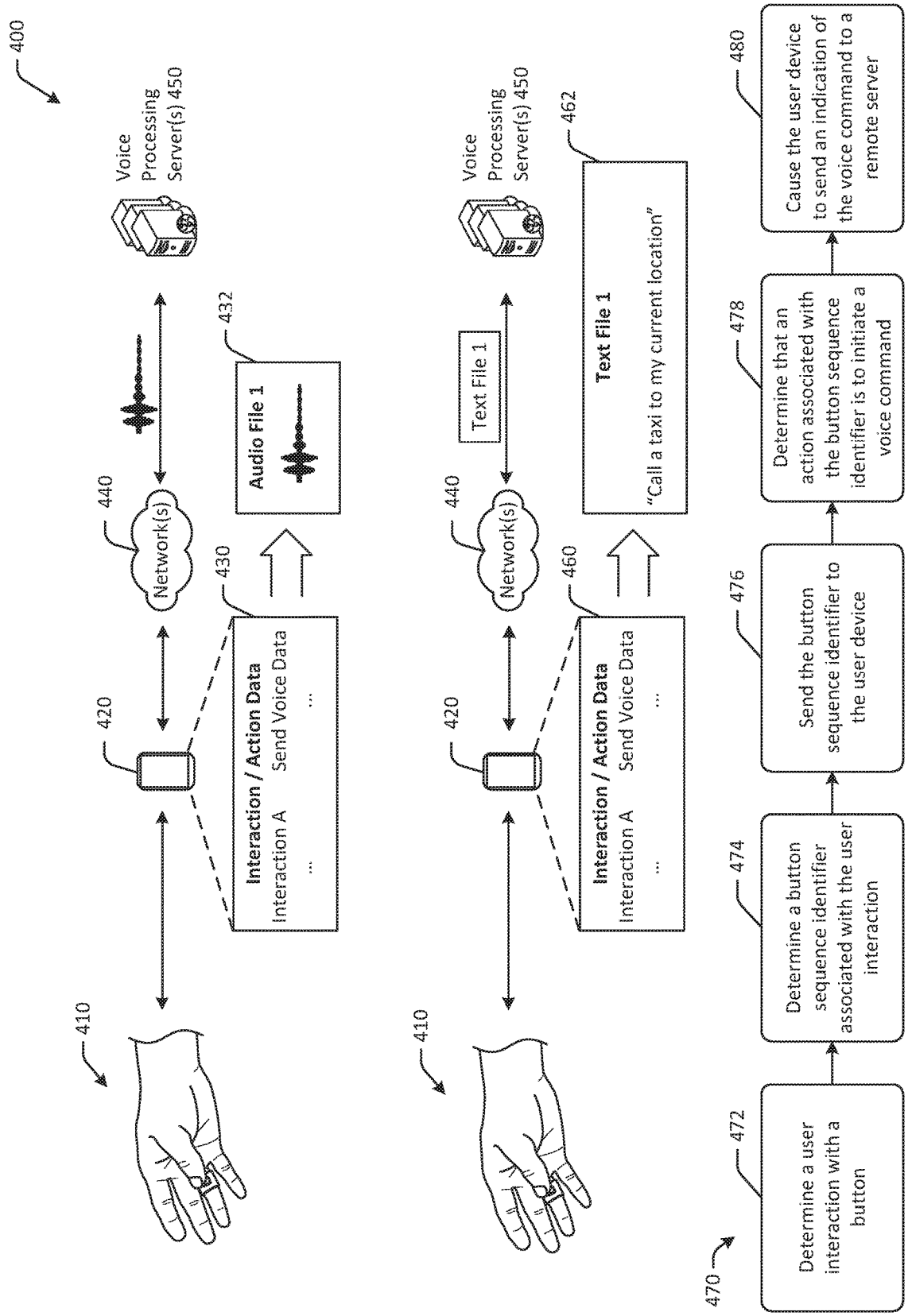
FIG. 4 is a schematic illustration of example automated voice assistant interaction in accordance with one or more example embodiments of the disclosure.

FIG. 4 is a schematic illustration of an example use case 400 for automated voice assistant interaction in accordance with one or more example embodiments of the disclosure. Although certain operations are illustrated in FIG. 4 as occurring at certain devices, in other embodiments, one or more operations may be performed by different computer systems and/or across a distributed computing environment. In addition, in other embodiments, data may be stored at different datastores and/or computer systems.

In FIG. 4, a user may perform a user interaction 410 at a ring-shaped electronic device. The user interaction 410 may be associated with an action of interacting with a voice assistant service. To interact with a voice assistant, in some embodiments, voice input may be used at a voice assistant. However, a user may not desire to speak a voice input in real-time, or at the time interaction with the voice assistant is desired. Accordingly, voice input corresponding to a desired request may be prerecorded in some embodiments, while in other embodiments, a transcription of a previous voice input may be used to interact with the voice assistant.

For example, the user interaction 410 may be a press-and-hold of a button at the ring-shaped electronic device for a certain length of time. The ring-shaped electronic device may determine the user interaction 410 and may send an indication of the user interaction, such as an interaction identifier, to a user device 420. The user device 420 may receive the indication and may determine, using interaction/ action data 430, that the action associated with the user interaction 410 is to "send voice data." The voice data to be sent may be a prerecorded voice command. For example, the user may speak a voice command or input at the user device 420 and may indicate that the voice command is to be sent when a certain user interaction at the ring-shaped electronic device is detected. The user device 420 may therefore store an audio file 432 of the voice command for use when the associated user interaction is detected. In other embodiments, the audio file 432 may be stored at the ring-shaped electronic device or at a remote server in addition to, or instead of, on the user device 420. After the user device 420 receives the indication of the user interaction 410, the user device 420 may determine that the audio file 432 of the voice command is to be sent to one or more voice processing servers 450, so as to interact with a voice assistant. Accordingly, although the user may not have spoken any voice input at the ring-shaped electronic device or the user device 420, the voice processing server 450 or another server associated with the voice assistant may receive the prerecorded audio file 432, as if the user had spoken the corresponding voice command in or near real-time. The user device 420 may send the audio file 432 to the voice processing server 450 over one or more networks 440. The voice processing server 450 may determine a meaning of the voice command and may initiate one or more actions automatically. For example, the audio file 432 may include a voice recording of the user saying "call a taxi to my current location." As a result, the voice processing server 450 may determine a location of the user device 420 and/or the ring-shaped electronic device, and may send a request to a computer system associated with a taxi service for a taxi to be sent to the location. Accordingly, a taxi may be sent to the user device 420 location without the user having to speak any commands and/or without the user having to interact with the user device 420.

In another embodiment, to interact with the voice assistant, rather than sending the prerecorded audio file 432, a text file or text data may be sent to the voice processing server 450. Text data may be text generated as a transcription of a previously recorded voice command, text input by the user during setup of the ring-shaped electronic device, or other text data. For example, the user interaction 410 may be detected at the ring-shaped electronic device. An indication of the user interaction 410 may be sent to the user device 420. The user device 420 may receive the indication and may determine an associated action of "send voice data." However, the voice data in this instance may be a text file 462 or other format of text data with the text "call a taxi to my current location." The text file 462 may be sent to the voice processing server 450 over one or more networks 440. The voice processing server 450 may determine a meaning of the text (and may skip or bypass any voice processing operations, as the text is not in voice format), and may send the request for the taxi to the computer system associated with the taxi service after determining the user location. Any suitable voice input may be used, in addition to the example of calling a taxi in FIG. 4. For example, weather information can be provided, food can be ordered, and/or any other request that can be completed by a voice assistant.

Accordingly, the ring-shaped electronic device may be used to interact with a voice assistant via voice input without the user having to speak any voice input at the time of interaction with the voice assistant. Instead, an audio file or a text file may be used to communicate with the voice assistant. Because voice commands can be related to remote devices, in some embodiments, users can use the ring-shaped electronic device to control remote devices via a voice assistant without having to speak commands or interact with the user device 420.

In some embodiments, the indication of the voice data that is sent to the voice processing server 450 may result in a follow up query from a voice assistant. The follow up query may be presented at the ring-shaped electronic device. For example, the voice data may have a meaning of "send a voice message to User X," and a follow up query of "OK, what would you like to say?" may be audibly presented to the user responsive to the voice request at the ring-shaped electronic device.

An example process flow 470 to initiate a voice command is illustrated in FIG. 4 and may be performed, for example, by one or more modules at the ring-shaped electronic device and/or the user device 420. The ring-shaped electronic device and/or user device 420 may include at least one memory that stores computer-executable instructions and at least one processor configured to access the at least one memory and execute the computer-executable instructions to perform various actions or operations, such as one or more of the operations in the process flow 470 of FIG. 4.

At a first block 472, the ring-shaped electronic device may determine a user interaction with a button. For example, the ring-shaped electronic device may determine that a user performed a press-and-hold button interaction.

At a second block 474, the ring-shaped electronic device may determine a button sequence identifier associated with the user interaction. For example, the button sequence identifier may be an indication of the user interaction detected or determined by the ring-shaped electronic device.

At a third block 476, the ring-shaped electronic device may send the button sequence identifier to the user device. For example, the ring-shaped electronic device may send the determined indication of the user interaction to the user device 420.

At a fourth block 478, the ring-shaped electronic device and/or the user device 420 may determine that an action associated with the button sequence identifier is to initiate a voice command. In some embodiments, the action associated with the button sequence identifier may be to activate a voice assistant at the user device 420. For example, after receiving the indication, the user device 420 may activate or initiate a voice assistant (e.g., a native voice assistant at the device or a different voice assistant) and may begin monitoring for voice input. In another embodiment, such as that illustrated in FIG. 4, the action associated with the button sequence identifier may be to initiate a predetermined voice command. The user device 420 may therefore determine an audio file and/or a text file for use as voice input to send to the voice processing server 450 or other server associated with the voice assistant service.

At a fifth block 480, the ring-shaped electronic device may cause the user device to send an indication of the voice command to a remote server. For example, the ring-shaped electronic device may cause the user device 420 to send the audio file 432, or another stored audio file, and/or the text file 462, or another stored text file, to the voice processing server 450 for processing.

Accordingly, the ring-shaped electronic device may be used to interact with a voice assistant via voice input without the user having to speak any voice input at the time of interaction with the voice assistant.

Figure 5:
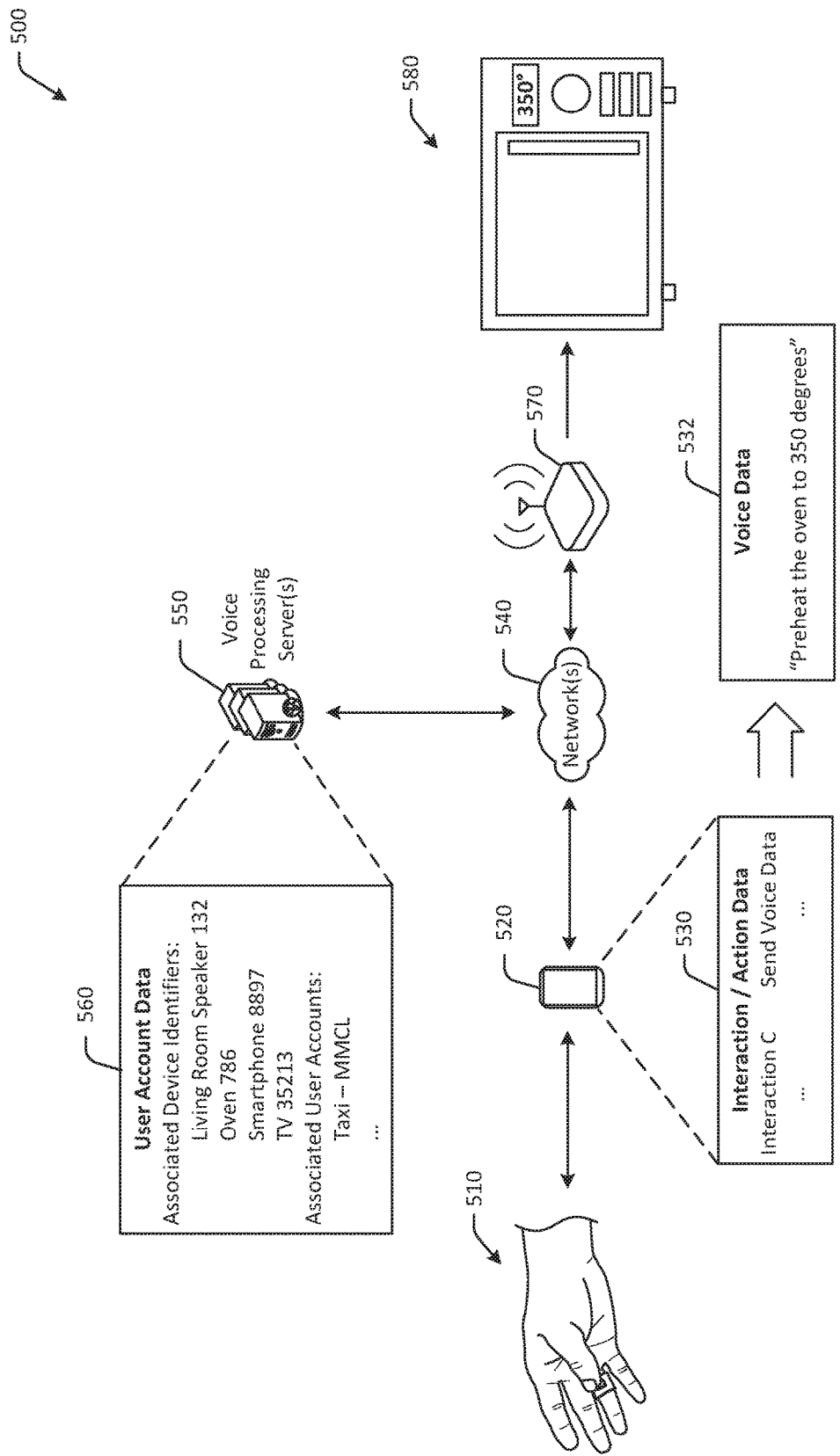
FIG. 5 is a schematic illustration of an example use case of automated device action implementation using ring-shaped electronic devices in accordance with one or more example embodiments of the disclosure.

FIG. 5 is a schematic illustration of an example use case 500 of automated device action implementation using ring-shaped electronic devices in accordance with one or more example embodiments of the disclosure. Although certain operations are illustrated in FIG. 5 as occurring at certain devices, in other embodiments, one or more operations may be performed by different computer systems and/or across a distributed computing environment. In addition, in other embodiments, data may be stored at different datastores and/or computer systems.

In FIG. 5, a user may perform a user interaction 510 at a ring-shaped electronic device. The user interaction 510 may be associated with an action of initiating an action at a remote device. To initiate an action at a remote device, in some embodiments, voice input may be used at a voice assistant. However, the user may not desire to speak the voice input at the time of the request. Accordingly, in some embodiments, voice input corresponding to the desired request may be prerecorded, while in other embodiments, a transcription of a previous voice input may be used to interact with the voice assistant.

The ring-shaped electronic device may detect or determine the user interaction 510 at a button of the ring-shaped electronic device. For example, the user interaction 510 may be a certain number of taps (e.g., one button tap, two button taps, three button taps, etc.) of the button within a certain time interval. The ring-shaped electronic device may send an indication of the detected user interaction 510 to a user device 520. The user device 520 may receive the indication and may determine, using interaction/action data 530, an action associated with the user interaction 510. For example, the user device 520 may determine that an action of "send voice data" is associated with the user interaction 510. The user device 520 may determine voice data 532 associated with the action. The voice data 532 may represent a voice input of "preheat the oven to 350 degrees."

The user device 520 may send the voice data 532 to one or more remote servers, such as voice processing server(s) 550, to determine a meaning of the voice data 532. In some embodiments, the voice data 532 may be an audio recording of previous voice input or utterance representing a voice command, while in other embodiments, the voice data 532 may be text, such as a transcription of previous voice input representing a voice command.

The voice processing server 550 may receive the voice data 532 and determine that a meaning of the voice data 532 is to preheat an oven associated with the user's account to 350 degrees. The voice processing server 550 may determine user account data 560 for a user account associated with the user device 520 and/or the ring-shaped electronic device. The user account data 560 may include device identifiers of devices that are associated with the user account, such as the ring-shaped electronic device, the user device 520, and other devices, such as speakers, appliances, televisions, streaming devices, and/or other devices. The user account data 560 may include associated user account information, such as taxi service user account information, delivery addresses, and/or other user account information. The voice processing server 550 may determine that an oven identifier is present in the user account data 560, and accordingly, that the oven should be preheated responsive to the voice data 532.

Accordingly, the voice processing server 550 may send a command or a signal to an oven 580 associated with the user account, as determined using the user account data 560. The command may cause the oven 580 to implement an action, such as preheat to 350 degrees. To send the command, the voice processing server 550 may communicate with the oven 580 via the networks 440 and/or an access point 570 in communication with the oven 580. The oven 580 may receive the command and may being preheating to 350 degrees.

As a result, the voice processing server 550 may determine that the voice data 532 (e.g., voice command, etc.) represents a request to implement an action at a certain user device, and may therefore identify the device and cause the device to implement the action.

Figure 6:
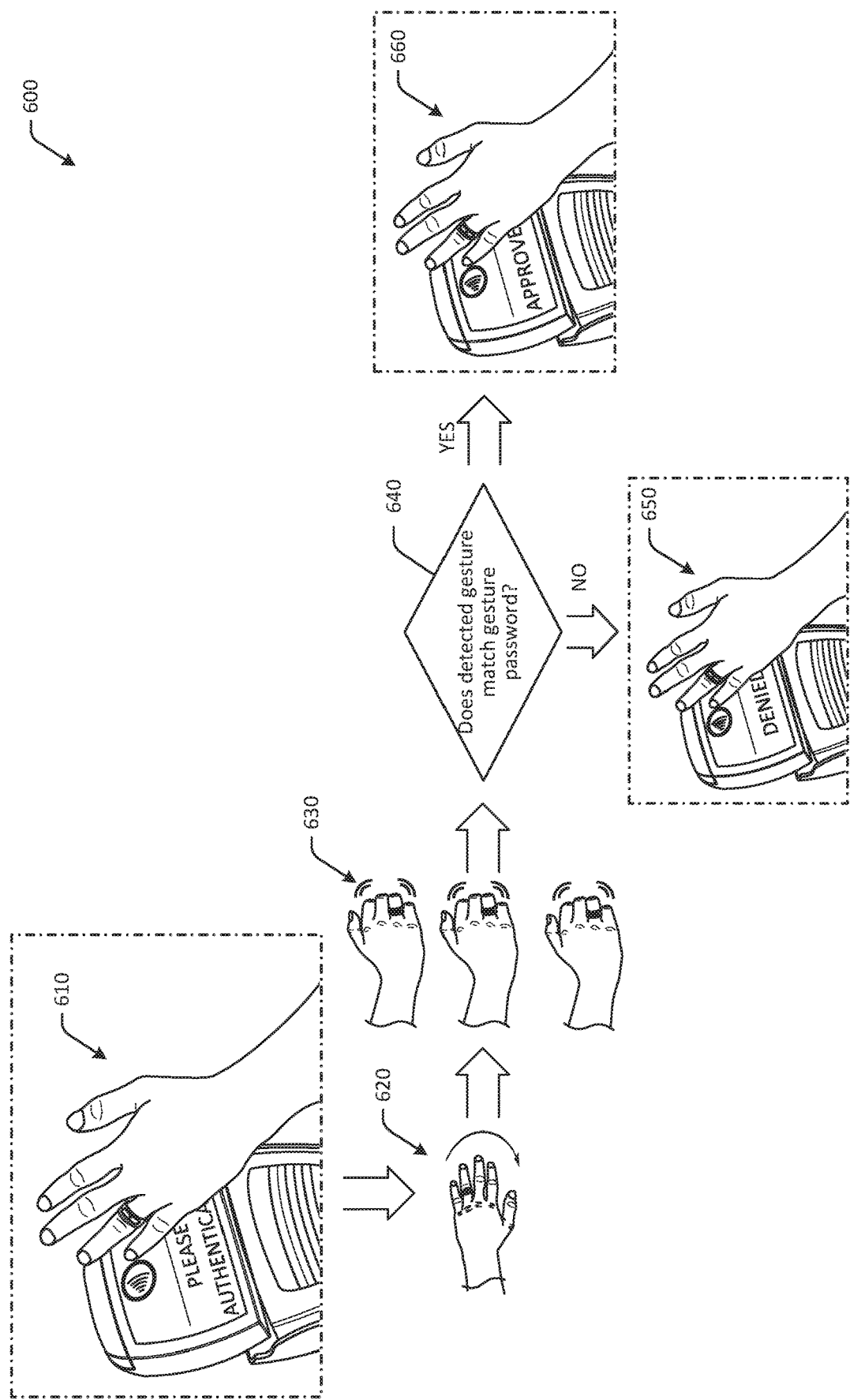
FIG. 6 is a schematic illustration of an example use case of payment authentication using ring-shaped electronic devices in accordance with one or more example embodiments of the disclosure.

FIG. 6 is a schematic illustration of an example use case 600 of payment authentication using ring-shaped electronic devices in accordance with one or more example embodiments of the disclosure. Different embodiments may include different, additional, or fewer inputs or outputs than those illustrated in the example of FIG. 6.

In FIG. 6, a user may desire to make a contactless payment using a ring-shaped electronic device at a point of sale device at a first instance 610. The point of sale device may request authentication from the ring-shaped electronic device for payment (or any other wireless request for payment information). The ring-shaped electronic device may communicate with the point of sale device using any suitable wireless communication protocol, such as Near Field Communication.

To authenticate the payment request from the point of sale device, the user of the ring-shaped electronic device may have to perform a certain gesture or set of gestures that acts as a password or other authentication mechanism. For example, at a second instance 620, the user may move the ring-shaped electronic device in a circle, and then at a third instance 630, the user may make a "knocking" motion three times. The circle movement and knocking three times gestures may be used to approve the payment request.

At a determination block 640, the ring-shaped electronic device may determine whether the detected gesture(s) match a gesture password. The detected gesture may be determined using motion sensor data compared to stored motion sensor data indicative of the gesture password. For example, during setup, the user may determine one or more gestures to use for payment authentication. If the ring-shaped electronic device determines at determination block 640 that the detected gesture matches the gesture password, the ring-shaped electronic device may send an approval notification or other payment information to the point of sale device at a fourth instance 660. The point of sale device may indicate that the payment is approved. If the ring-shaped electronic device determines at determination block 640 that the detected gesture does not match the gesture password, the ring-shaped electronic device may not send the approval notification or may otherwise deny the request, and at a fifth instance 650, the payment may be denied and the point of sale may indicate the denial.

As a result, users can use ring-shaped electronic devices to make payments and to perform other actions by authenticating using motion based authentication techniques. Users may therefore not have to interact with connected user devices during, for example, wireless payments.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
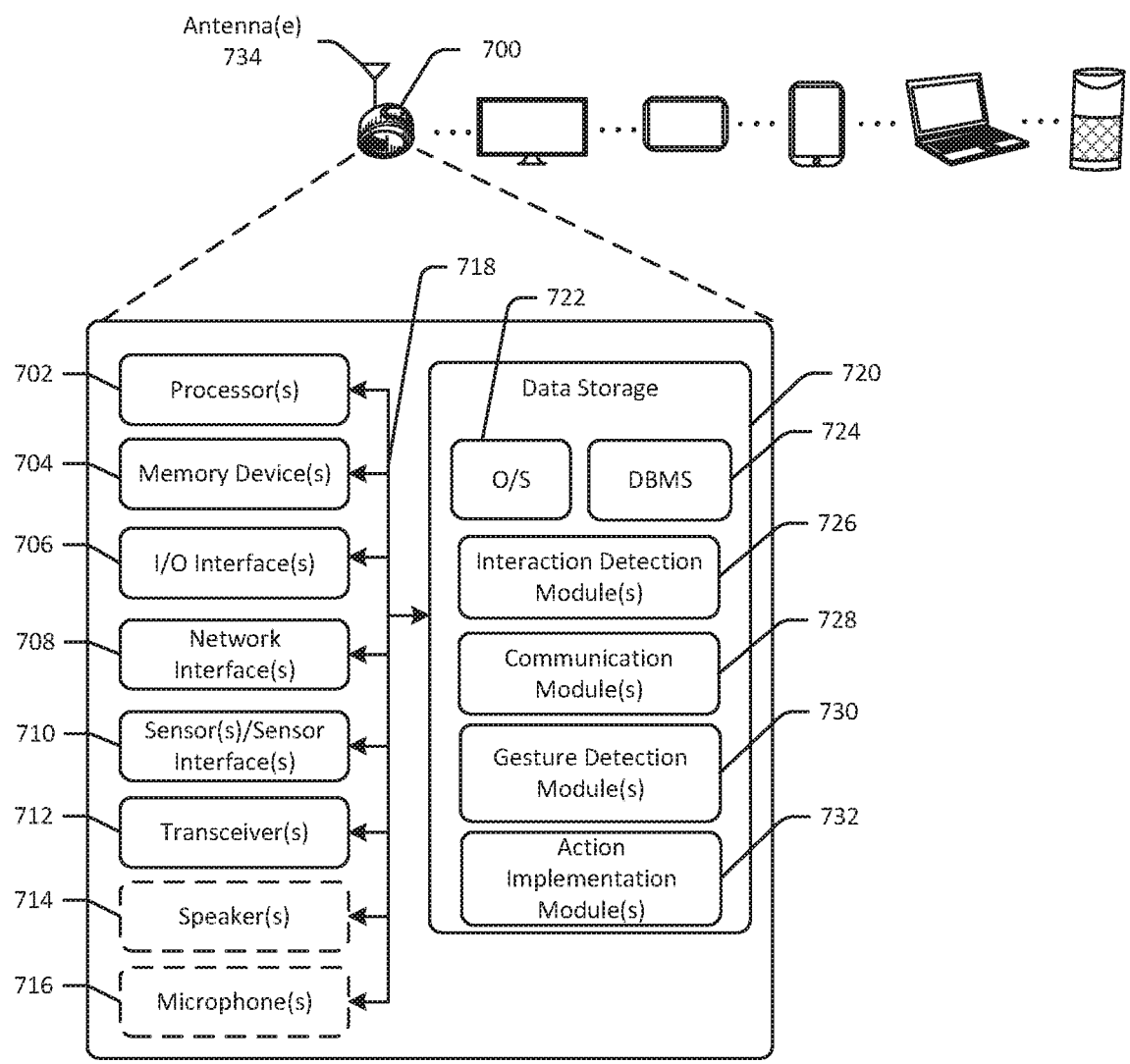
FIG. 7 is a schematic block diagram of an illustrative device in accordance with one or more example embodiments of the disclosure.

FIG. 7 is a schematic block diagram of an illustrative ring-shaped electronic device 700 in accordance with one or more example embodiments of the disclosure. The ring-shaped electronic device 700 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The ring-shaped electronic device 700 may correspond to an illustrative device configuration for the devices of FIGS. 1-6.

The ring-shaped electronic device 700 may be configured to communicate via one or more networks with one or more servers, search engines, user devices, or the like. In some embodiments, a single remote server or single group of remote servers may be configured to perform more than one type of action initiation functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the ring-shaped electronic device 700 may include one or more processors (processor(s)) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The ring-shaped electronic device 700 may further include one or more buses 718 that functionally couple various components of the ring-shaped electronic device 700. The ring-shaped electronic device 700 may further include one or more antenna(e) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the ring-shaped electronic device 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the ring-shaped electronic device 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more interaction detection module(s) 726, one or more communication module(s) 728, one or more gesture detection module(s) 730, and/or one or more action implementation module(s) 732. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the ring-shaped electronic device 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, user preference information, user action information, user contact data, device pairing information, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the ring-shaped electronic device 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the interaction detection module(s) 726 may include computer-executable instructions, code, or the like that responsive to execution by one or more of the processor(s) 702 may perform functions including, but not limited to, determining button presses, taps, or other button/control interactions, determining button sequence identifiers, determining interaction sequence identifiers, determining contextual data, determining voice commands, determining voice input, determining wakeword utterances, and the like.

The communication module(s) 728 may include computer-executable instructions, code, or the like that responsive to execution by one or more of the processor(s) 702 may perform functions including, but not limited to, communicating with one or more devices, for example, via wired or wireless communication, communicating with user devices, communicating with remote servers, communicating with remote datastores, sending or receiving notifications or commands/directives, communicating with cache memory data, communicating with user devices, and the like.

The gesture detection module(s) 730 may include computer-executable instructions, code, or the like that responsive to execution by one or more of the processor(s) 702 may perform functions including, but not limited to, analyzing motion data, determining occurrence of gesture motions, determining patterns of gestures, determining actions associated with gestures, authenticating requests, and the like.

The action implementation module(s) 732 may include computer-executable instructions, code, or the like that responsive to execution by one or more of the processor(s) 702 may perform functions including, but not limited to, determining user selected action preferences, determining actions associated with user interactions, determining actions associated with gestures, determining user devices associated with a user account, and the like.

Referring now to other illustrative components depicted as being stored in the data storage 720, the O/S 722 may be loaded from the data storage 720 into the memory 704 and may provide an interface between other application software executing on the ring-shaped electronic device 700 and hardware resources of the ring-shaped electronic device 700. More specifically, the O/S 722 may include a set of computer-executable instructions for managing hardware resources of the ring-shaped electronic device 700 and for providing common services to other application programs (e.g., managing memory allocation among various application programs). In certain example embodiments, the O/S 722 may control execution of the other program module(s) 722 to for content rendering. The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the ring-shaped electronic device 700 is a mobile device, the DBMS 724 may be any suitable light-weight DBMS optimized for performance on a mobile device.

Referring now to other illustrative components of the ring-shaped electronic device 700, the input/output (I/O) interface(s) 706 may facilitate the receipt of input information by the ring-shaped electronic device 700 from one or more I/O devices as well as the output of information from the ring-shaped electronic device 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the ring-shaped electronic device 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The ring-shaped electronic device 700 may further include one or more network interface(s) 708 via which the ring-shaped electronic device 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna(e) 734 may include any suitable type of antenna depending, for example, on the communications protocols used to transmit or receive signals via the antenna(e) 734. Non-limiting examples of suitable antennas may include directional antennas, non-directional antennas, dipole antennas, folded dipole antennas, patch antennas, multiple-input multiple-output (MIMO) antennas, or the like. The antenna(e) 734 may be communicatively coupled to one or more transceivers 712 or radio components to which or from which signals may be transmitted or received.

As previously described, the antenna(e) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 734 may be configured to transmit or receive radio frequency signals within any suitable frequency range forming part of the unlicensed portion of the radio spectrum.

The antenna(e) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 734—transmitting or receiving radio frequency (RF) signals in the bandwidth and/or channels corresponding to the communications protocols utilized by the ring-shaped electronic device 700 to communicate with other devices. The transceiver(s) 712 may include hardware, software, and/or firmware for modulating, transmitting, or receiving—potentially in cooperation with any of antenna(e) 734—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the ring-shaped electronic device 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors (e.g., motion sensor(s)), force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data, and may include noise cancellation functionality.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the ring-shaped electronic device 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the ring-shaped electronic device 700 may include alternate and/or additional hardware, software, or firmware components beyond those described or depicted without departing from the scope of the disclosure. More particularly, it should be appreciated that software, firmware, or hardware components depicted as forming part of the ring-shaped electronic device 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
determining, by a ring-shaped electronic device comprising a button, a first user interaction with the button, wherein the ring-shaped electronic device is wirelessly coupled to a user device;
determining that a first action associated with the first user interaction is to initiate a synchronous communication;
determining a second user interaction with the button;
determining that a second action associated with the second user interaction is to initiate a voice command;
causing the user device to send a stored audio file indicative of the voice command to a remote server;
generating a notification indicative of an incoming synchronous communication;
determining motion data representing a user gesture during presentation of the notification; and
causing audible presentation of contact information associated with the incoming synchronous communication.

2. The method of claim 1, further comprising:
causing the user device to send a stored text file to the remote server.

3. The method of claim 1, wherein the user device is a first user device, the method further comprising:
determining that the voice command represents a request to implement a third action at a second user device; and
causing the second user device to implement the third action.

4. The method of claim 1, further comprising:
determining that the voice command represents a request to a third party service;
causing the user device to determine a location of the user device; and
causing the user device to send the location in association with the request to the third party service.

5. The method of claim 1, further comprising:
determining a wireless request for payment information;
determining motion data representing a user gesture;
determining that the user gesture substantially matches a gesture password; and
sending the payment information.

6. The method of claim 1, further comprising:
determining a third user interaction with the button;
determining that a third action associated with the third user interaction is to activate a voice assistant at the user device; and
causing the voice assistant to be activated at the user device.

7. The method of claim 1, further comprising:
determining contact information stored in association with the first action at the user device; and
initiating, using the user device, the synchronous communication using the contact information;
wherein the contact information comprises a telephone number, and wherein initiating the synchronous communication using the contact information comprises initiating a telephone call via a cellular network using the telephone number.

8. The method of claim 7, further comprising:
determining contact information stored in association with the first action at the user device;
initiating, using the user device, the synchronous communication using the contact information;

determining a set of user device identifiers associated with the user account; and causing a notification of an incoming synchronous communication to be sent to at least one device associated with the set of user device identifiers;
wherein initiating the synchronous communication using the contact information comprises initiating the synchronous communication via a cellular data network using at least one of the set of user device identifiers.

9. The method of claim 1, further comprising:
determining a first button sequence identifier associated with the first user interaction; and
sending the first button sequence identifier to a user device using a wireless connection.

10. A ring-shaped electronic device comprising:
a button;
a speaker;
a microphone;
memory configured to store computer-executable instructions; and
at least one computer processor configured to access the memory and execute the computer-executable instructions to:
determine a first user interaction with the button, wherein the ring-shaped electronic device is wirelessly coupled to a user device;
determine that a first action associated with the first user interaction is to initiate a synchronous communication;
determine contact information stored in association with the first action at the user device;
initiate, using the user device, the synchronous communication using the contact information;
determine a second user interaction with the button;
determine that a second action associated with the second user interaction is to initiate a voice command;
determine an indication associated with the voice command;
cause the user device to send a stored audio file indicative of the voice command to a remote server;
determine a wireless request for payment information;
determine motion data representing a user gesture using the motion sensor;
determine that the user gesture substantially matches a gesture password; and
send the payment information.

11. The ring-shaped electronic device of claim 10, wherein the at least one processor is further configured to access the memory and execute the computer-executable instructions to:
generate a notification indicative of an incoming synchronous communication;
determine motion data representing a user gesture during presentation of the notification; and
cause audible presentation of contact information associated with the incoming synchronous communication.

12. A device comprising:
memory configured to store computer-executable instructions; and
at least one computer processor configured to access the memory and execute the computer-executable instructions to:
determine a first user interaction with a button of the device, wherein the device is wirelessly coupled to a user device;

determine that a first action associated with the first user interaction is to initiate a synchronous communication;

determine contact information stored in association with the first action at the user device;

initiate, using the user device, the synchronous communication using the contact information;

determine a second user interaction with the button;

determine that a second action associated with the second user interaction is to initiate a first voice command;

determine an indication associated with the first voice command;

cause the user device to send a stored audio file indicative of the first voice command to a remote server;

determine that the first voice command represents a request to a third party service;

cause the user device to determine a location of the user device; and cause the user device to send the location in association with the request to the third party service.

13. The device of claim 12, wherein the user device is a first user device, wherein the at least one processor is further configured to access the memory and execute the computer-executable instructions to:

determine that a second voice command represents a request to implement a third action at a second user device; and cause the second user device to implement the third action.

14. The device of claim 12, wherein the at least one processor is further configured to access the memory and execute the computer-executable instructions to:

generate a notification indicative of an incoming synchronous communication;

determine motion data representing a user gesture during presentation of the notification; and cause audible presentation of contact information associated with the incoming synchronous communication.

15. The device of claim 12, wherein the at least one processor is further configured to access the memory and execute the computer-executable instructions to:

determine a wireless request for payment information;

determine motion data representing a user gesture;

determine that the user gesture substantially matches a gesture password; and send the payment information.

16. The device of claim 12, wherein the at least one processor is further configured to access the memory and execute the computer-executable instructions to:

determining a third user interaction with the button;

determining that a third action associated with the third user interaction is to activate a voice assistant at the user device; and causing the voice assistant to be activated at the user device.

17. The device of claim 12, wherein the device is a ring-shaped electronic device.

18. The device of claim 12, wherein the button is on a lower half of the device.

19. The device of claim 12, wherein the device is wherein the device is wirelessly coupled to the user device via a Bluetooth connection.

20. The device of claim 12, wherein the button is a physically pressable button.

* * * * *